United States Patent [19]
Contrea et al.

[11] 3,807,981

[45] Apr. 30, 1974

[54] POLYPHOSPHATE GLASS OF POLYMETALS USEFUL IN ANIMAL FEED

[75] Inventors: Aureliu Contrea; Marin Milos, both of Timisoara, Romania

[73] Assignee: Institutul Agronomic Timisoara, Timisoara, Romania

[22] Filed: Apr. 27, 1971

[21] Appl. No.: 137,989

[30] Foreign Application Priority Data
May 6, 1970  Romania............................... 63272

[52] U.S. Cl................................ 65/62, 71/1, 71/34, 106/47 R, 426/2, 426/342, 426/74, 426/807
[51] Int. Cl............................ C03b 1/00, A23j 1/00
[58] Field of Search ......... 99/2 CD, 4; 71/1, 34, 62, 71/64 G; 106/47 R; 65/62

[56] References Cited
UNITED STATES PATENTS

| 866,641 | 9/1907 | Fuchs | 99/4 |
| 3,127,238 | 3/1964 | Fuchs | 106/47 |
| 1,056,603 | 3/1913 | Stiefel | 99/4 |
| 3,058,804 | 10/1962 | Tynan | 99/2 CD |
| 2,689,794 | 9/1954 | Jackson | 99/2 CD |
| 2,732,290 | 1/1956 | Vana et al. | 71/34 |

FOREIGN PATENTS OR APPLICATIONS

| 119,129 | 6/1947 | Sweden | 99/2 CD |
| 829,774 | 3/1960 | Great Britain | 106/47 |

OTHER PUBLICATIONS

Morey, G. W., The Properties of Glass, 1954, p. 105.

*Primary Examiner*—Norman Yudkoff
*Assistant Examiner*—Curtis P. Ribando
*Attorney, Agent, or Firm*—Karl F. Ross; Herbert Dubno

[57] ABSTRACT

An animal feed and premix concentrate based on inorganic chelates. Metal microingredients including Fe, Zn, Mn, Cu and Co are incorporated in a soluble polymetallic phosphate glass which has an average chain length of 2.75–5 phosphate atoms and a sodium content in gram equivalents equal to 45–90 percent of the total amount of gram equivalent of metallic ion. The concentrate consists of 2–12% Fe; 2.5–10% Zn; 3–8% Mn; 0.2–7% Cu; 0.01–2% Co; 12–27% Na; 22–30% P and 35–55% $O_2$.

1 Claim, No Drawings

POLYPHOSPHATE GLASS OF POLYMETALS USEFUL IN ANIMAL FEED

The invention refers to a concentrate of microingredients based on inorganic chelates, incorporated in premixes and feed which contains some metals that have the role of microingredients, especially manganese, copper, zinc, cobalt and iron.

A method of including microingredients in premixes and feeds, in the form of mineral salts, is known. The disadvantage of this method consists of the fact that the ions of these metals can escape the intestinal absorption after the ingestion of food. This is possible either through formation of insoluble compounds, due to the interaction of these ions with certain components of the food, or through their binding with natural chelating agents (phitic acid, etc) to form complexes of great stability, thus rendering them inactive.

There is also another method of incorporating the microingredients into premixes as chelate-type complexes with organic substances, (organic acids, complex-technological processes and expensive basic materials which increases the fabrication cost.

The utilization of different metallic condensed phosphates, like pyrophosphate, hexametaphosphate and tripolyphosphate of zinc as microingredient additives in feeds is also known. The disadvantages of this method are that the microingredients are introduced in the form of low solubility compounds and do not ensure the uniform repartition of several microingredients in the mass of a single product.

According to the invention, the concentrate eliminates the above-mentioned disadvantages since it results as is desirable, in a soluble product of uniform distribution of its components. The concentrate consists of 2–12% Fe; 2.5–10% Zn; 3–8% Mn; 0.2–7% Cu; 0.01–2% Co; 12–27% Na; 22–30% P; and 37–55% $O_2$, a mixture formed of oxides, carbonates or volatile salts of the respective metals with microingredients and sodium phosphate. The metals which have the role of microingredients are incorporated in a soluble polymetallic phosphate glass with an average chain length of 2.5–5 and with a sodium content in gram equivalents, equal to 45–90 percent of the total amount of gram equivalents of metallic ion. The mixture is melted for 1 to 2 hours at temperatures of 900°–1200°C. This is followed by quenching and grinding of the mixture until it passes through a sieve with meshes of 0.1 mm.

An example of the invention is given below when realizing the incorporation of the microingredients Mn, Cu, and Co in feeds for hybrid breeders and in premixes for hybrid broilers.

A mixture is introduced in a platinum crucible, in the following proportion: 9.61 % $MnCo_3$; 1.15 % CuO; 0.03 % $CoCl_2 \cdot 6H_2O$; 35 % $Na_2HPO_4 \cdot 2 H_2O$ and 54.21 % $NaH_2PO_4 \cdot H_2O$. The mixture is heated gradually in an electric furnace to the temperature of 900°–1200°C, and maintained for 1–2 hours at this temperature. The melt is poured on a plate of stainless steel and after cooling is ground until it passes through sieve meshes of 0.1 mm, resulting in a violaceous slightly hydroscopic powder having the following composition: 6.27 % Mn; 1.25 % Cu; 0.01 % Co; 24.69 % Na; 24.83 % P and 43.85 % $O_2$. The solubility in water is 50-60 g %.

According to the invention, the concentrate can be obtained by treatment of a mixture where manganese carbonate is substituted by manganese dioxide in an equivalent proportion to ensure the same content of manganese.

The microingredients are generally added in such proportions as to ensure in the final product the following contents: 2–12 % Fe; 2.5–10 % Zn; 3–8 % Mn; 0.2–7 % Cu; 0.01–2 % Co; 12–27 % Na; 22 – 30 % P and 37–55 % $O_2$. The product is incorporated in rations in quantity of 0.6381 g product/1 kg feed, which corresponds to 40 mg Mn; 8 mg Cu and 0.07 mg Co, and is administered, for 35 days to hybrid breeding chickens which at the beginning of the experiment were 35 days old. A better assimilation of microingredients and feeds is obtained, in comparison with other methods, as it can be seen from the following table:

Gain in weight and specific feed consumption of hybrid breeder chicks.

| Lot No. | Method of incorporation | Average initial weight | Average final weight | Gain in weight (g) | Gain in weight (%) | Feed consumption | Specific consumption kg/kg gain % |
|---|---|---|---|---|---|---|---|
| 1. | Control without micro-ing. | 314 | 645 | 331 | 100 | 1390 | 4.20 | 100 |
| 2. | Micro-ing. in salt form | 314 | 682 | 368 | 111.1 | 1496 | 4.06 | 96.6 |
| 3. | Micro-ing. in salt form + complexon III. | 312 | 710 | 398 | 120.2 | 1538 | 3.86 | 91.9 |
| 4. | Micro-ing. in the form of the product according to the invention. | 314 | 719 | 405 | 122.4 | 1538 | 3.80 | 90.5 |

The product according to the invention, obtained by the above mentioned method, can be incorporated in the same quantities per 1 kg feed and administered for 49 days to hybrid broilers Studler 7 days old at the beginning of the experiment.

In comparison with other methods, better results are obtained due to a better assimilation of the microingredients and feeds, as can be seen from the following table:

Gain in weight and specific feed consumtion of hybrid broiler chicks

| Lot No. | Method of incorporation | Average initial weight g | Average final weight g | Gain in weight g | Gain in weight % | Feed consumption g | Specific consumption kg/kg gain | Specific consumption % |
|---|---|---|---|---|---|---|---|---|
| 1. | Micro-ingr. in the form of mineral salts | 69 | 1413 | 1344 | 100 | 2976 | 2.215 | 100 |
| 2. | Micro-ingr. in the form of the product obtained in accordance with the invention | 68 | 1535 | 1468 | 109.2 | 2990 | 2.038 | 92.1 |

The following advantages are achieved when the invention is applied:

a greater gain in weight is ensured than in case of the incorporation of microingredients in the form of mineral salts;

the specific feed consumption is reduced as compared to the incorporation of microingredients in the form of mineral salts;

a uniform distribution is obtained for several microingredients in the mass of a single product with a good water-solubility;

easily available natural materials are used as metallic oxides and carbonates from natural storages or industrial wastes and sodium phosphates;

the technique used is simple in comparison with methods required to obtain organo-metallic chelates;

economy of metallic microingredients is achieved by diminishing the dose of microingredients in accordance with their increased biocatalytical efficiency.

We claim:

1. The method of producing a concentrate which comprises the steps of heating gradually to melting in a platinum crucible a mixture of Fe, Zn manganese, in the form of $MnCO_3$ or an equivalent of $MnO_2$, CuO, $CoCl_2$, $Na_2HPO_4$, and $NaH_2PO_4$ in an amount ensuring concentrations in the final product of 2 to 12% Fe; 2.5 to 10% Zn; 3 to 8% Mn; 0.2 to 7% Cu; 0.01 to 2% Co; 12 to 27% Na; 22 to 30% P and 37 to 55% $O_2$, to a temperature of 900°–1,200°C; maintaining said mixture for a period of 1 to 2 hours at this temperature, solidifying the resulting melt; and grinding the solidified said melt until it passes a sieve mesh of 0.1 mm.

* * * * *